US 8,498,864 B1

(12) United States Patent
Liang et al.

(10) Patent No.: US 8,498,864 B1
(45) Date of Patent: Jul. 30, 2013

(54) METHODS AND SYSTEMS FOR PREDICTING A TEXT (71) Applicant: Google Inc., Mountain View, CA (US)

(72) Inventors: Yu Liang, Mountain View, CA (US); Xiaotao Duan, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/628,138

(22) Filed: Sep. 27, 2012

(51) Int. Cl.
*G10L 15/00* (2013.01)

(52) U.S. Cl.
USPC .......................... 704/235; 704/236; 369/25.01

(58) Field of Classification Search
USPC ................... 704/235, 246; 369/25.01
See application file for complete search history.

(56) References Cited

U.S. PATENT DOCUMENTS

| 6,163,767 A | 12/2000 | Tang et al. | |
| 7,941,316 B2 * | 5/2011 | Mahajan et al. | 704/235 |
| 2005/0248546 A1 | 11/2005 | Kong | |
| 2007/0100619 A1 * | 5/2007 | Purho | 704/239 |
| 2008/0076472 A1 | 3/2008 | Hyatt | |
| 2008/0120102 A1 * | 5/2008 | Rao | 704/235 |
| 2008/0133228 A1 * | 6/2008 | Rao | 704/231 |
| 2008/0235029 A1 | 9/2008 | Cross et al. | |
| 2010/0031143 A1 * | 2/2010 | Rao et al. | 715/261 |
| 2012/0078627 A1 | 3/2012 | Wagner | |
| 2012/0143607 A1 * | 6/2012 | Longe et al. | 704/235 |

* cited by examiner

*Primary Examiner* — Daniel D Abebe
(74) *Attorney, Agent, or Firm* — McDonnell Boehnen Hulbert & Berghoff LLP (57) ABSTRACT Methods and systems for predicting a text are described. In an example, a computing device may be configured to receive one or more typed characters that compose a portion of a text; and receive, a voice input corresponding to a spoken utterance of at least a portion of the text. The computing device may be configured to determine, based on the one or more typed characters and the voice input, one or more candidate texts predicting the text. Further, the computing device may be configured to provide the one or more candidate texts.

18 Claims, 7 Drawing Sheets

METHODS AND SYSTEMS FOR PREDICTING A TEXT

BACKGROUND

As the field of computer science has evolved, a variety of data entry techniques have been developed to enhance the individual's experience and to make computers more versatile. For example, a typical computer system, especially a computer system using graphical user interfaces for user interaction may be optimized for accepting input from one or more input devices. Thus, an individual may enter text with a keyboard, and control the position of a pointer image on a display screen with a pointing device, such as a mouse, having one or more buttons for activating selections associated with the location of the pointer.

Recently, interest has been shown in enhancing usability of computers. Usability can be defined as the ease of use and learnability of a human-made object. The object can be a software application, website, book, tool, machine, process, or anything a human interacts with. Enhancing efficiency, accuracy, or elegance of computers may improve their usability.

BRIEF SUMMARY

The present application discloses systems and methods for predicting a text. In one aspect, a method is described. The method may comprise receiving one or more typed characters that compose a portion of a text. The method also may comprise receiving a voice input corresponding to a spoken utterance of at least the portion of the text. The method further may comprise determining, based on the one or more typed characters and the voice input, one or more candidate texts predicting the text. The method also may comprise providing the one or more candidate texts.

In another aspect, a computer readable medium having stored thereon instructions that, when executed by a computing device, cause the computing device to perform functions is described. The functions may comprise receiving one or more typed characters that compose a portion of a text. The functions also may comprise receiving a voice input corresponding to a spoken utterance of at least the portion of the text. The functions further may comprise determining, based on the one or more typed characters and the voice input, one or more candidate texts predicting the text. The functions also may comprise providing the one or more candidate texts.

In still another aspect, a system is described. The system may comprise an audio capture device. The system also may comprise a computing device coupled to the audio capture device and configured to receive one or more typed characters that compose a portion of a text. The computing device also may be configured to receive, from the audio capture device, a voice input corresponding to a spoken utterance of at least the portion of the text. The computing device further may be configured to determine, based on the one or more typed characters and the voice input, one or more candidate texts. The computing device also may be configured to determine, for each of the one or more candidate texts, a respective likelihood that a respective candidate text predicts the text. The computing device further may be configured to provide the one or more candidate texts, based on respective likelihoods determined for the one or more candidate texts.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A device such as desktop computer, a laptop, or a handheld device may be configured to receive input text using an input device. In an example, a user of a desktop computer may enter text into a word processing program or other software application using a keyboard. In devices with touch screens such as cellular telephones and tablet computers, the user may enter text by tapping on on-screen keys, for example. The device may be configured to receive a portion of a text (e.g., a word or a phrase) and may be configured to provide a user with a candidate text that predicts the rest of the text based on the received portion of the text.

In some examples, one key or button of an input device may represent more than one letter, such as on mobile phones. Each key press may result in a prediction rather than repeatedly sequencing through the same group of "letters" the key press may represent. In examples, the device may be configured to allow for an entire word to be input by single key press. In this manner, the device may be configured to make efficient use of fewer device keys to input a text into a text message, an e-mail, an address book, a calendar, etc.

In some examples, the input text may not be accurate, particularly in situations in which a user may be using small keys or when a user is distracted. As a result, user-entered text may contain errors. When a user enters a character sequence that does not correspond to a known word, the device may be configured to predict and correct the character sequence. In some examples, a mistyped word may be replaced with a corresponding correct word. In other examples, the device may be configured to present the user with a list of possible alternatives from which a correct word may be selected. However, errors may decrease accuracy with which the device may correctly predict the text or provide a list that contains the correct word.

In examples, an input device having Latin letters may be used to enter Pinyin characters. Pinyin input method may be considered as an official input method to transcribe characters of some Asian languages (e.g., Chinese, Taiwanese, Japanese, Korean, Malaysian, etc.) into a Latin script. Pinyin means "spelled sound," and may generally refer to a phonics-based Asian language input.

As an example, a QWERTY keyboard may be utilized for Pinyin input to enter Latin characters and combination of Latin characters that phonetically represent the intended Asian character. A software application may then process the Latin characters and may convert the Latin characters to a corresponding Asian character.

As an example for illustration, a Chinese word may be composed of several Chinese characters. Each of the Chinese characters may be represented by several Pinyin characters. Thus, inputting Pinyin characters can be time consuming and may be error prone. Additionally, in some examples, instead of typing Pinyin characters of multiple words forming a phrase, Pinyin initials of the multiple words (i.e., first letter of each word) may be used for efficient input; however, accuracy of prediction of the phrase may be decreased.

Therefore, predicting a text in any language based on a portion of the text may be inaccurate in many instances.

In some examples, instead of using a portion of text to predict the text, a computing device may be configured to receive a voice input corresponding to a spoken utterance of the text and utilize speech recognition techniques to identify the text. However, because of different accents or background noise, for instance, the computing device may not accurately predict the text. As another example, in the Chinese language, several characters may have similar pronunciations (e.g., different dialects), which may decrease an accuracy of predicting a corresponding text based on the voice input.

In an example, accuracy of predicting a text may be improved if a portion of the text and a spoken utterance of the text are substantially concurrently received at the computing device and both used by the computing device to predict the text. In this example, a computing device may be configured to receive typed characters that compose the portion of a text; and receive, e.g., from an audio capture device, a voice input corresponding to the spoken utterance of the text. Accordingly, the computing device may be configured to determine, based on the portion of the text and the voice input, one or more candidate texts predicting the text. Further, the computing device may be configured to provide the one or more candidate texts to a user.

Figure 1:
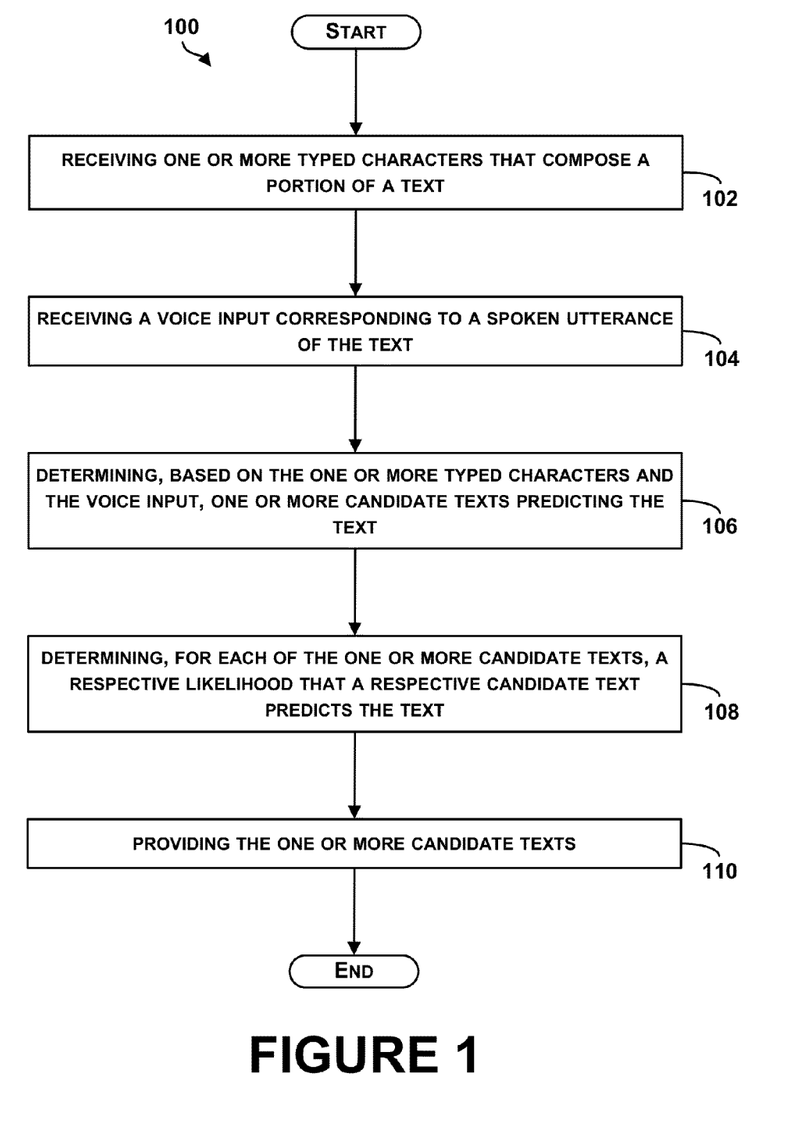
FIG. 1 is a flowchart of an example method for predicting a text, in accordance with an embodiment.

FIG. 1 illustrates a flowchart of an example method 100 for predicting a text, in accordance with an embodiment.

The method 100 may include one or more operations, functions, or actions as illustrated by one or more of blocks 102-110. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 100 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 100 and other processes and methods disclosed herein, each block in FIG. 1 may represent circuitry that is wired to perform the specific logical functions in the process.

At block 102, the method 100 includes receiving one or more typed characters that compose a portion of a text. A computing device (e.g., a mobile telephone, personal digital assistant (PDA), laptop, notebook, or netbook computer, tablet computing device, a wearable computing device, etc.) may be configured to receive typed characters through an input device coupled to the computing device, such as a keyboard or a touch screen. These input devices are used as examples for illustration only. Any type of an input device can be used.

As utilized herein, the term character is intended to encompass a symbol or other figure that may be typed by a user. Examples of characters include alphabetic characters, whether from the Latin, Cyrillic, Arabic, Hebrew, or Greek alphabets, for example. In addition, a character may be one of the various symbols utilized in Asian languages, such as the Chinese, Japanese, and Korean languages. The text may include groups of various characters that form words or word-type units. As an example, the text can be a Chinese character that can be represented by one or more Pinyin characters, and the Chinese character can be part of a Chinese word. Therefore, the text may refer to a morpheme (smallest meaningful unit of a written language), a word, a phrase, etc.

In an example, the portion of the text may be one or more letters that form a portion of a word, for example. In another example, the portion of the text may include Pinyin initials of words that form a phrase. These examples are for illustration only, and other examples are possible.

In examples, the computing device may include an Input Method Editor (IME) module configured to facilitate receiving the portion of the text at the computing device. The IME can be an operating system component or program that allows any data, such as keyboard strokes, touchscreen input, or mouse movements, to be received as input. In this manner, users can enter characters and symbols not found on input devices. For instance, a user of Latin keyboards coupled to the computing device can input Chinese, Japanese, Korean and Indic characters, etc. On hand-held devices, such as mobile phones, the IME module may be configured to enable using the numeric keypad to enter Latin alphabet characters (or any other alphabet characters) or enable a screen display to be touched to enter the characters.

At block 104, the method 100 includes receiving a voice input corresponding to a spoken utterance of the text. The computing device may include or be coupled to an audio capture device (e.g., a microphone) that may be configured to capture audio signals. In an example, the computing device may be configured to receive, from the audio capture device, an audio signal representing a voice input that corresponds to a spoken utterance of the text by the user typing the portion of the text. In examples, the spoke utterance may be of the whole text, or of at least a portion of the text (e.g., a first syllable of a word of the text, an entire sentence, the portion of the text composed by the typed characters, etc.).

Figure 2A:
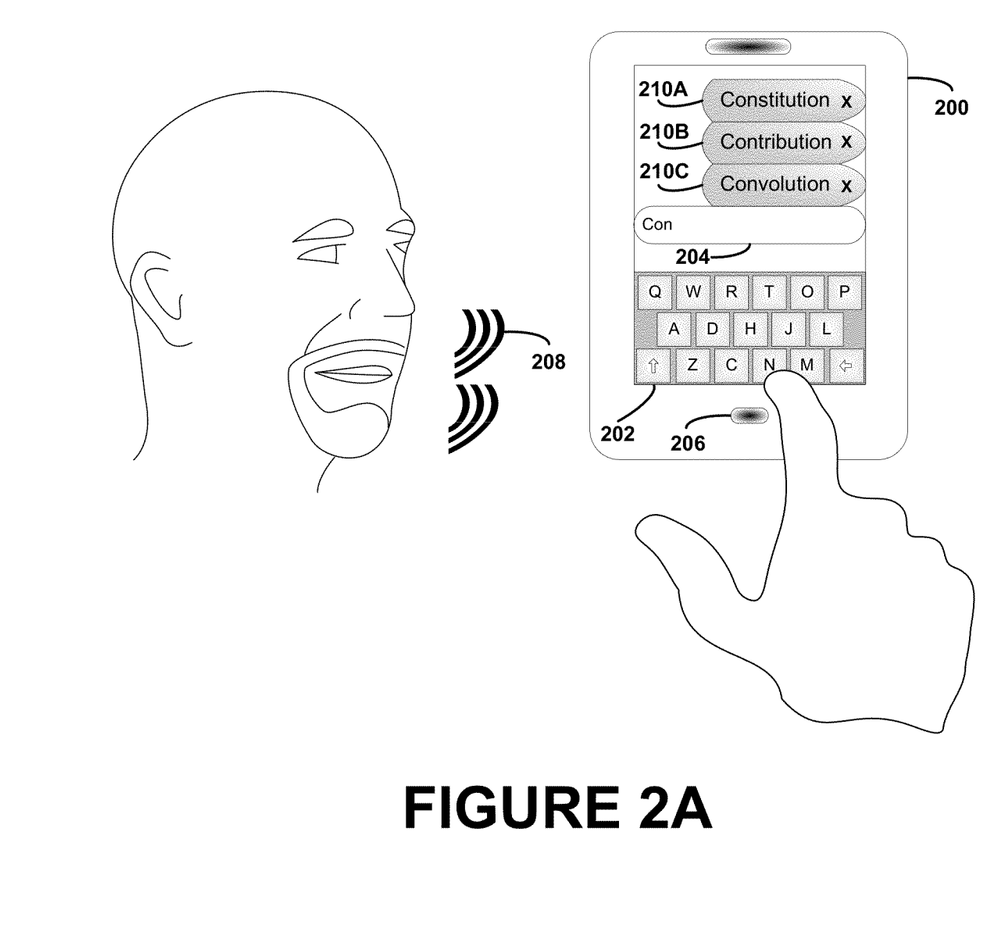
FIG. 2A illustrates an example computing device used for predicting a text, with a typed input text being in the same language as a spoken utterance of the text, in accordance with an embodiment.

FIG. 2A illustrates an example computing device 200 used for predicting a text, with a typed input text being in the same language as a spoken utterance of the text, in accordance with an embodiment. The computing device 200 may be coupled to a touch screen 202, as an example. The computing device 200 may be configured to receive a portion of the text through an input box 204. FIG. 2A shows that the portion of the text, as an example, is "Con."

The computing device 200 may be coupled to a microphone 206 configured to capture a spoken utterance 208 of the text. As an example, a user may begin to type a text (e.g., a word) and at the same time, or soon before/after, speak the text. In some examples, the computing device 200 may be configured to receive, substantially concurrently, the portion of the text typed in the input box 204 and a voice input corresponding to the spoken utterance 208 (captured by the microphone 206) of the text. The user may type, for example, a subset of letters forming a word, and be finished with speaking the word before typing the whole word. In other examples, however, the portion of the text and the voice input corresponding to the spoken utterance 208 may not be received concurrently and there may be a delay between receiving the portion of the text and the voice input, e.g., the portion of the text may be received before the spoken utterance 208 is received at the microphone 206, or vice versa.

In some examples, the portion of the text and the spoken utterance 208 may be in the same language. In other examples, however, the portion of the text and the spoken utterance 208 may be in different languages. For example, the computing device 200 may be configured to receive the portion of the text as one or more Pinyin characters (Latin characters) that form a Chinese word, or Pinyin initials that form a phrase in Chinese; and receive the voice input corresponding to the spoken utterance 208 that is in Chinese.

Figure 2B:
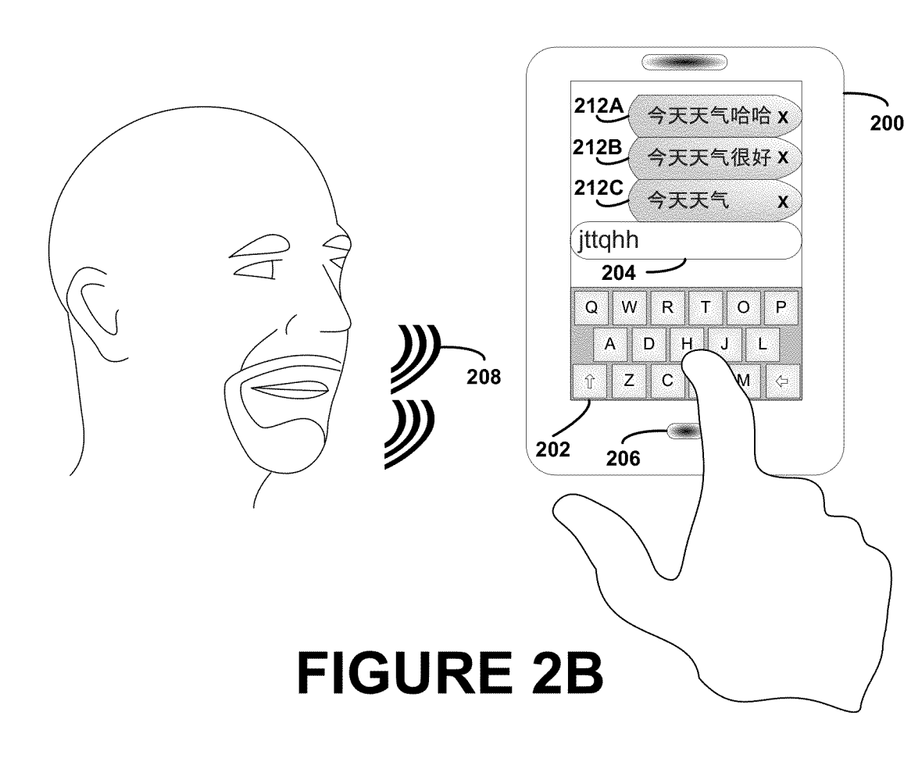
FIG. 2B illustrates an example computing device used for predicting a text, with a typed input text in a language different from a respective language of a spoken utterance of the text, in accordance with an embodiment.

FIG. 2B illustrates the example computing device 200 used for predicting a text, with a typed input text in a language different from a respective language of a spoken utterance of the text, in accordance with an embodiment. FIG. 2B depicts the computing device 200 receiving, through the input box 204, Pinyin initials "jttqhh" of a full Pinyin phrase "jin tian tian qi hen hao" meaning "what a nice day today." The spoken utterance 208, in this example, may be in Chinese. The Chinese language here is used as an example, but any other language can be used. In an example, language settings (e.g., typing language and spoken language options) can be established by a user of the computing device 200.

Referring back to FIG. 1, at block 106, the method 100 includes determining, based on the one or more typed characters and the voice input, one or more candidate texts predicting the text. In one example, referring to FIG. 2A, the computing device 200 may be configured to provide the portion of the text and the voice input to a server, and the server may be configured to determine candidate texts that predict the text. The server further may be configured to provide the candidate texts to the computing device 200. The computing device 200 and the server may be in wired or wireless communication. In another example, however, the computing device 200 may be configured to determine the candidate texts based on the portion of the text and the voice input.

In other examples, the task of determining the candidate texts can be distributed between the computing device 200 and the server. As an example for illustration, the computing device 200 may be configured to determine candidate texts based on the portion of the text, and may be configured to provide the portion of the text and the voice input to the server, which is configured to determine respective candidate texts. The server may then be configured to transmit the respective candidate texts to the computing device 200. Further, the computing device 200 may be configured to compare the candidate texts determined by the computing device 200 and the respective candidate texts determined by the server to determine a set of candidate texts that has a high likelihood of predicting the text intended by the user. Other examples are possible. Herein, the computing device 200 will be used to describe performing the task of determining the candidate texts; however, it should be understood that such functionality can be performed by a server in communication with the computing device 200 or can be distributed between the computing device 200 and the server.

As an example, to determine the candidate texts based on the portion of the text, the computing device 200 (or the server) may be configured to have access to a dictionary storing a plurality of words, phrases, or other lexical units (i.e., a single word, a part of a word, or a chain of words that forms the basic elements of a language's lexicon) and corresponding lexical tags. The computing device 200 may be configured to use the dictionary to generate candidate texts based on the portion of the text. The candidate texts may contain likely words or phrases in the dictionary best matching the portion of the text. The lexical tags associate the lexical units with particular groups or categories of words or phrases. When the portion of the text is received at the computing device 200, the computing device 200 may be configured to identify a search tag indicating that the word or phrase being entered belongs to a particular group or category. When a search tag is identified, the computing device 200 may be configured to compare the search tag with the lexical tags stored in the dictionary. The computing device 200 may be configured to use the comparison results to filter, sort, or otherwise process the candidate texts. For example, the candidate texts may be limited to words and/or phrases that have a matching lexical tag. Also, the computing device 200 may be configured to use the tag comparison results to sort the candidate texts such that the words and/or phrases having a matching lexical tag appear at the top of a list of candidate texts.

In an example, to determine a set of candidate texts based on the voice input, the computing device 200 (or the server) may be configured to utilize a speech recognition system to determine the set of candidate texts. The speech recognition system may be configured to use an acoustic model to determine a most likely character according to an inputted syllable, and also may be configured to use a dictionary with probabilities and a language model that stores a higher level pattern of language usage to recognize the character.

In one example, the computing device 200 may be configured to determine the candidate texts based on the portion of the text and use the voice input to confirm or discard a subset of the candidate texts. In another example, the computing device 200 may be configured to determine the candidate texts based on the voice input and use the portion of the text to confirm or discard a respective subset of the candidate texts. In still another example, the computing device 200 may be configured to determine, based on the portion of the text, a first set of candidate texts; and substantially concurrently determine, based on the voice input, a second set of candidate texts. Further the computing device 200 may be configured to compare the first set of candidate texts and the second set of candidate texts to determine the candidate texts that are common between the first set and the second set, for example.

Referring back to FIG. 1, at block 108, the method 100 includes determining, for each of the one or more candidate texts, a respective likelihood that a respective candidate text predicts the text. For example, the computing device 200 may be configured to generate a probabilistic model (e.g., a Gaussian distribution), based on the portion of the text and the voice input received, to determine a likelihood that a candidate text predicts the text. As an example, the likelihood that the candidate text predicts the text may be determined as a function of a set of parameter values that are determined based on the portion of the text and the voice input. In this example, the likelihood may be defined as equal to probability of an observed outcome (e.g., the candidate text predicts the text) given those parameter values. Those skilled in the art will appreciate that determining the likelihood function may involve distinguishing between discrete probability distribution, continuous probability distribution, and mixed continuous-discrete distributions, and that several types of likelihood exist such as log likelihood, relative likelihood, conditional likelihood, marginal likelihood, profile likelihood, and partial likelihood.

In still another example, the computing device 200 may be configured to process the portion of the text and the voice input through a classifier to determine the likelihood. The classifier can be defined as an algorithm or mathematical function implemented by a classification algorithm that maps input information (e.g., the portion of the text and the voice input) to a class (e.g., the candidate text correctly predicts the text).

Classification may involve identifying to which of a set of classes (e.g., "the candidate text correctly predicts the text," and "the candidate text does not correctly predict the text") a new observation may belong, on the basis of a training set of data containing observations (or instances) with a known class. The individual observations may be analyzed into a set of quantifiable properties, known as various explanatory variables or features. As an example, classification may include assigning a respective likelihood to "the candidate text correctly predicts the text" or "the candidate text does not correctly predict the text" classes as indicated by received information (e.g., the portion of the text, and the voice input).

In one example, the classification may include a probabilistic classification. Probabilistic classification algorithms may output a probability of an instance (e.g., a typing instance or a group of observations indicated by the received information relating to prediction of the text) being a member of each of the possible classes: "the candidate text correctly predicts the text" or "the candidate text does not correctly predict the text." Determining likelihood of a candidate text correctly predicting the text may be based on probability assigned to each class. Also, the probabilistic classification can output a confidence value associated with prediction of the text.

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "the candidate text correctly predicts the text" or "the candidate text does not correctly predict the text") by combining a feature vector (vector of parameters associated with the portion of the text and the voice input) of an instance (e.g., a typing instance) with a vector of weights, using a dot product. Class with the higher score or likelihood may be selected as a predicted class. This type of score function is known as a linear predictor function and may have this general form:

$$\text{Score}(X_i, k) = \beta_k \cdot X_i \qquad \text{Equation (1)}$$

where $X_i$ is the feature vector for instance i, $\beta_k$ is a vector of weights corresponding to category k, and score($X_i$, k) is the score associated with assigning instance i to category k.

As an example, a training computing device may be configured to receive training data for a plurality of typing instances. For example, for each of the plurality of typing instances, respective training data may include respective typed characters and a respective voice input. Also, the training computing device may be configured to determine, for a respective text of each of the plurality of typing instances, a given candidate text; and receive positive or negative indication that the given candidate text correctly predicts the respective text. Further the training computing device may be configured to correlate, for each typing instance, the positive or negative indication with the respective training data; and determine parameters (e.g., vector of weights for Equation 1) of the classifier based on the correlations for the plurality of typing instances. These parameters may be provided to and stored at the computing device 200 such that as the computing device 200 receives the portion of the text and the voice input in any typing instance, the computing device 200 may be configured to process the portion of the text and the voice input through the classifier using the determined parameters of the classifier to determine the likelihood that a candidate text correctly predicts the text.

In one example, the likelihood may be qualitative such as "low," "medium," or "high" or may be numerical such as a number on a scale, for example. Other examples are possible.

In one example, the computing device 200 may be configured to determine a first likelihood associated with determining a candidate text based on the portion of the text; and determine a second likelihood associated with determining the candidate text based on the voice input. Further, the computing device 200 may be configured to combine the first likelihood and the second likelihood to determine an overall likelihood that the candidate text predicts the text. Combining the first and second likelihoods may include determining a mathematical function (e.g., summation, etc.) of the first and second likelihoods, for example. In another example, combining the first and second likelihoods may produce a qualitative overall likelihood. Table 1 below illustrates examples for illustration of combining the first likelihood and the second likelihood for an example candidate text.

TABLE 1

| First Likelihood | Second Likelihood | Overall Likelihood |
|---|---|---|
| Low | Low | Low |
| Low | High | Medium |
| High | High | High |

In an example, in addition to determining the respective likelihood that a candidate text predicts the text, the computing device 200 may be configured to determine a respective ranking for the candidate text. As an example, referring to FIG. 2A, the computing device 200 may be configured to determine, based on the portion of the text "Con" and the voice input corresponding to the spoken utterance 208, three candidate texts: "Constitution," "Contribution," and "Convolution." The computing device may be configured to determine a respective likelihood for each of the three candidate texts; and determine, based on the respective likelihood, a respective ranking for each of the three candidate texts. The respective ranking may be indicative of a level of confidence that a respective candidate text predicts the text, for example. For instance, "Constitution" may rank highest, while "Convolution" may rank lowest based on the respective likelihoods of these two candidate texts.

Referring back to FIG. 1, at block 110, the method 100 includes providing the one or more candidate texts. For example, the computing device may be configured to visually present the determined candidate texts to a user of the computing device. As an example, referring to FIG. 2A, the computing device 200 may be configured to generate a display of a list of the candidate texts 210A, 210B, and 210C. The candidate texts 210A-C can be user-selectable such that a user may select a correct candidate text that matches the text the user may be attempting to type and thus, the correct candidate text may be inserted in the input box 204 on the touch screen 202 of the computing device 200.

In one example, the computing device 200 may be configured to present the display of the list based on the respective rankings (determined at block 108 above) of the candidate texts 210A-C. For example, the highest ranking candidate text may be at the top of the list.

In the example of the task of determining the candidate texts being distributed between the computing device 200 and a server, the computing device 200 may be configured to present candidate texts determined or predicted based on the portion of the text to the user, while providing the portion of the text and the voice input to the server. Upon receiving candidate texts results from the server, the computing device 200 may be configured to modify the list of the candidate texts displayed to include candidate texts received from the server, or may change the ranking of the candidate texts based on information received from the server. For example, referring to FIG. 2B, the computing device may have determined, based on the Pinyin initials "jttqhh" corresponding to "今天天气很好" ("what a nice day"), three candidate texts 212A "今 天天气哈哈", 212B "今天天气很好", and 212C "今天天气". Also, the computing device 200 may have ranked the candidate text 212B as second. Based on information received from the server, the computing device 200 may be configured to change the ranking.

In another example, the computing device 200 may be configured to receive the portion of the text and the input voice to determine the candidate texts and rank the candidate texts based on the respective likelihood; and as the user continues to type, the computing device 200 may be configured to receive one more typed character and accordingly change the candidate texts and/or the ranking of the candidate texts based on the one more character. The computing device 200, thus, may be configured to update the candidate texts and the respective likelihoods. Updating the candidate texts may include confirming or discarding a subset of the candidate texts. If the candidate texts are presented in a list, for example, the computing device 200 may be configured to perform one or more of: removing one of the candidate texts from the list, (ii) adding one more candidate text to the list, or (iii) changing an order in which the candidate texts are displayed on the list.

Figure 2C:
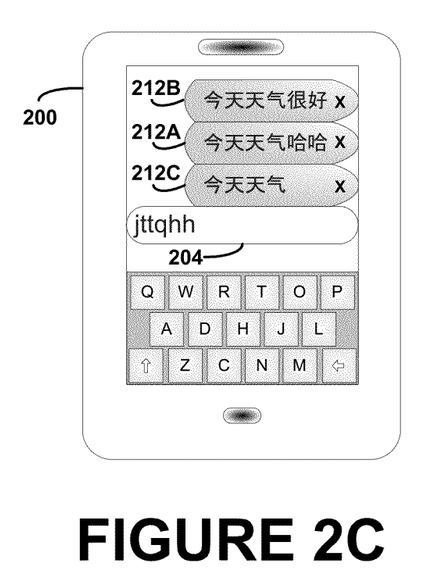
FIG. 2C illustrates an example computing device used for predicting a text, with the computing device displaying candidate texts in a changed ranking, in accordance with an embodiment.

FIG. 2C illustrates the example computing device 200 used for predicting a text, with the computing device 200 displaying candidate texts in a changed ranking, in accordance with an embodiment. FIG. 2C shows ranking of the candidate texts 212A-C changed (i.e., with respect to the ranking depicted in FIG. 2B) such that the candidate text 212B is at the top of the list, which may indicate that the candidate text 212B has the highest likelihood of predicting the text. As described above, in examples, the change in the ranking may be caused by receiving at the computing device 200 more typed characters, or caused by receiving (e.g., from a server) updated candidate texts based on the portion of the text and the voice input.

Figure 3:
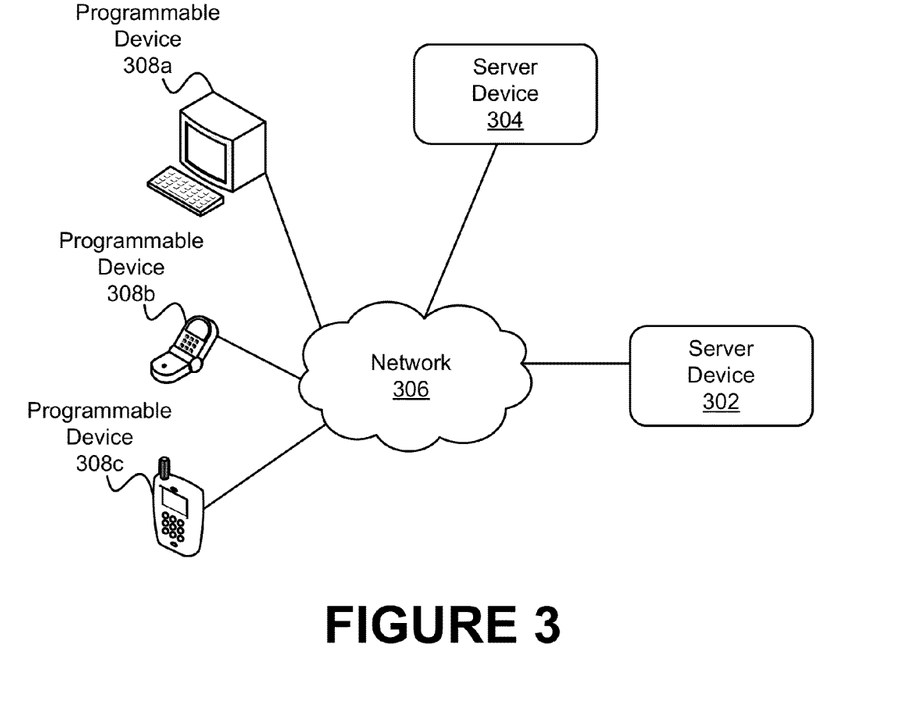
FIG. 3 illustrates an example distributed computing architecture, in accordance with an example embodiment.

FIG. 3 illustrates an example distributed computing architecture, in accordance with an example embodiment. FIG. 3 shows server devices 302 and 304 configured to communicate, via network 306, with programmable devices 308*a*, 308*b*, and 308*c*. The network 306 may correspond to a LAN, a wide area network (WAN), a corporate intranet, the public Internet, or any other type of network configured to provide a communications path between networked computing devices. The network 306 may also correspond to a combination of one or more LANs, WANs, corporate intranets, and/or the public Internet.

Although FIG. 3 shows three programmable devices, distributed application architectures may serve tens, hundreds, or thousands of programmable devices. Moreover, the programmable devices 308*a*, 308*b*, and 308*c* (or any additional programmable devices) may be any sort of computing device, such as an ordinary laptop computer, desktop computer, network terminal, wireless communication device (e.g., a tablet, a cell phone or smart phone, etc.), and so on. In some examples, the programmable devices 308*a*, 308*b*, and 308*c* may be dedicated to the design and use of software applications. In other examples, the programmable devices 308*a*, 308*b*, and 308*c* may be general purpose computers that are configured to perform a number of tasks and may not be dedicated to software development tools.

The server devices 302 and 304 can be configured to perform one or more services, as requested by programmable devices 308*a*, 308*b*, and/or 308*c*. For example, server device 302 and/or 304 can provide content to the programmable devices 308*a*-308*c*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, the server device 302 and/or 304 can provide the programmable devices 308*a*-308*c* with access to software for database, search, computation, graphical, audio, video, World Wide Web/Internet utilization, and/or other functions. Many other examples of server devices are possible as well.

The server devices 302 and/or 304 can be cloud-based devices that store program logic and/or data of cloud-based applications and/or services. In some examples, the server devices 302 and/or 304 can be a single computing device residing in a single computing center. In other examples, the server device 302 and/or 304 can include multiple computing devices in a single computing center, or multiple computing devices located in multiple computing centers in diverse geographic locations. For example, FIG. 3 depicts each of the server devices 302 and 304 residing in different physical locations.

In some examples, data and services at the server devices 302 and/or 304 can be encoded as computer readable information stored in non-transitory, tangible computer readable media (or computer readable storage media) and accessible by programmable devices 308a, 308b, and 308c, and/or other computing devices. In some examples, data at the server device 302 and/or 304 can be stored on a single disk drive or other tangible storage media, or can be implemented on multiple disk drives or other tangible storage media located at one or more diverse geographic locations.

Figure 4A:
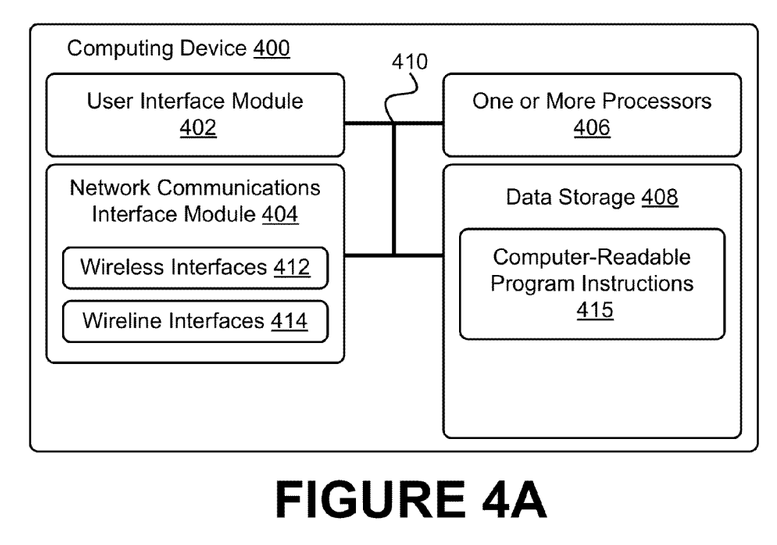
FIG. 4A is a block diagram of an example computing device, in accordance with an example embodiment illustrates.

FIG. 4A is a block diagram of a computing device (e.g., system) in accordance with an example embodiment. In particular, computing device 400 shown in FIG. 4A can be configured to perform one or more functions of the server devices 302, 304, network 306, and/or one or more of the programmable devices 308a, 308b, and 308c. The computing device 400 may include a user interface module 402, a network communications interface module 404, one or more processors 406, and data storage 408, all of which may be linked together via a system bus, network, or other connection mechanism 410.

The user interface module 402 can be operable to send data to and/or receive data from external user input/output devices. For example, user interface module 402 can be configured to send and/or receive data to and/or from user input devices such as a keyboard, a keypad, a touch screen, a computer mouse, a track ball, a joystick, a camera, a voice recognition/synthesis module, and/or other similar devices. The user interface module 402 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user interface module 402 can also be configured to generate audible output(s), such as a speaker, speaker jack, audio output port, audio output device, earphones, and/or other similar devices.

The network communications interface module 404 can include one or more wireless interfaces 412 and/or one or more wireline interfaces 414 that are configurable to communicate via a network, such as network 306 shown in FIG. 3. The wireless interfaces 412 can include one or more wireless transmitters, receivers, and/or transceivers, such as a Bluetooth transceiver, a Zigbee transceiver, a Wi-Fi transceiver, a LTE transceiver, and/or other similar type of wireless transceiver configurable to communicate via a wireless network. The wireline interfaces 414 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, the network communications interface module 404 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The processors 406 can include one or more general purpose processors and/or one or more special purpose processors (e.g., digital signal processors, application specific integrated circuits, etc.). The processors 406 can be configured to execute computer-readable program instructions 415 that are contained in the data storage 408 and/or other instructions as described herein (e.g., the method 100).

The data storage 408 can include one or more computer-readable storage media that can be read and/or accessed by at least one of processors 406. The one or more computer-readable storage media can include volatile and/or non-volatile storage components, such as optical, magnetic, organic or other memory or disc storage, which can be integrated in whole or in part with at least one of the processors 406. In some examples, the data storage 408 can be implemented using a single physical device (e.g., one optical, magnetic, organic or other memory or disc storage unit), while in other examples, the data storage 408 can be implemented using two or more physical devices.

The data storage 408 can include computer-readable program instructions 415 and perhaps additional data, such as but not limited to data used by one or more processes and/or threads of a software application. In some examples, data storage 408 can additionally include storage required to perform at least part of the herein-described methods (e.g., the method 100) and techniques and/or at least part of the functionality of the herein-described devices and networks.

Figure 4B:
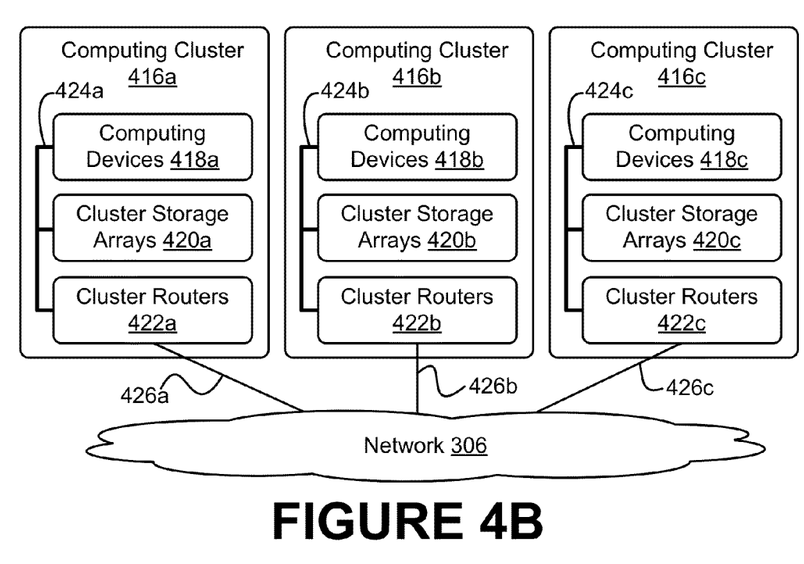
FIG. 4B illustrates a cloud-based server system, in accordance with an example embodiment.

FIG. 4B depicts a cloud-based server system, in accordance with an example embodiment. In FIG. 4B, functions of the server device 302 and/or 304 can be distributed among three computing clusters 416a, 416b, and 416c. The computing cluster 416a can include one or more computing devices 418a (e.g., the computing device 400), cluster storage arrays 420a, and cluster routers 422a connected by a local cluster network 424a. Similarly, the computing cluster 416b can include one or more computing devices 418b, cluster storage arrays 420b, and cluster routers 422b connected by a local cluster network 424b. Likewise, computing cluster 416c can include one or more computing devices 418c, cluster storage arrays 420c, and cluster routers 422c connected by a local cluster network 424c.

In some examples, each of the computing clusters 416a, 416b, and 416c can have an equal number of computing devices, an equal number of cluster storage arrays, and an equal number of cluster routers. In other examples, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In the computing cluster 416a, for example, the computing devices 418a can be configured to perform various computing tasks of the server device 302. In one example, the various functionalities of the server device 302 can be distributed among one or more of computing devices 418a, 418b, and 418c. The computing devices 418b and 418c in the computing clusters 416b and 416c can be configured similarly to the computing devices 418a in computing cluster 416a. On the other hand, in some examples, the computing devices 418*a*, 418*b*, and 418*c* can be configured to perform different functions.

In some examples, computing tasks and stored data associated with server devices 302 and/or 304 can be distributed across computing devices 418*a*, 418*b*, and 418*c* based at least in part on the processing requirements of the server devices 302 and/or 304, the processing capabilities of computing devices 418*a*, 418*b*, and 418*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 420*a*, 420*b*, and 420*c* of the computing clusters 416*a*, 416*b*, and 416*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the server devices 302 and/or 304 can be distributed across computing devices 418*a*, 418*b*, and 418*c* of computing clusters 416*a*, 416*b*, and 416*c*, various active portions and/or backup portions of these components can be distributed across cluster storage arrays 420*a*, 420*b*, and 420*c*. For example, some cluster storage arrays can be configured to store the data of the server device 302, while other cluster storage arrays can store data of the server device 304. Additionally, some cluster storage arrays can be configured to store backup versions of data stored in other cluster storage arrays.

The cluster routers 422*a*, 422*b*, and 422*c* in computing clusters 416*a*, 416*b*, and 416*c* can include networking equipment configured to provide internal and external communications for the computing clusters. For example, the cluster routers 422*a* in computing cluster 416*a* can include one or more internet switching and routing devices configured to provide (i) local area network communications between the computing devices 418*a* and the cluster storage arrays 420*a* via the local cluster network 424*a*, and (ii) wide area network communications between the computing cluster 416*a* and the computing clusters 416*b* and 416*c* via the wide area network connection 426*a* to network 306. The cluster routers 422*b* and 422*c* can include network equipment similar to the cluster routers 422*a*, and the cluster routers 422*b* and 422*c* can perform similar networking functions for the computing clusters 416*b* and 416*c* that the cluster routers 422*a* perform for the computing cluster 416*a*.

In some examples, the configuration of the cluster routers 422*a*, 422*b*, and 422*c* can be based at least in part on the data communication requirements of the computing devices and cluster storage arrays, the data communications capabilities of the network equipment in the cluster routers 422*a*, 422*b*, and 422*c*, the latency and throughput of the local networks 424*a*, 424*b*, 424*c*, the latency, throughput, and cost of wide area network links 426*a*, 426*b*, and 426*c*, and/or other factors that can contribute to the cost, speed, fault-tolerance, resiliency, efficiency and/or other design goals of the moderation system architecture.

Figure 5:
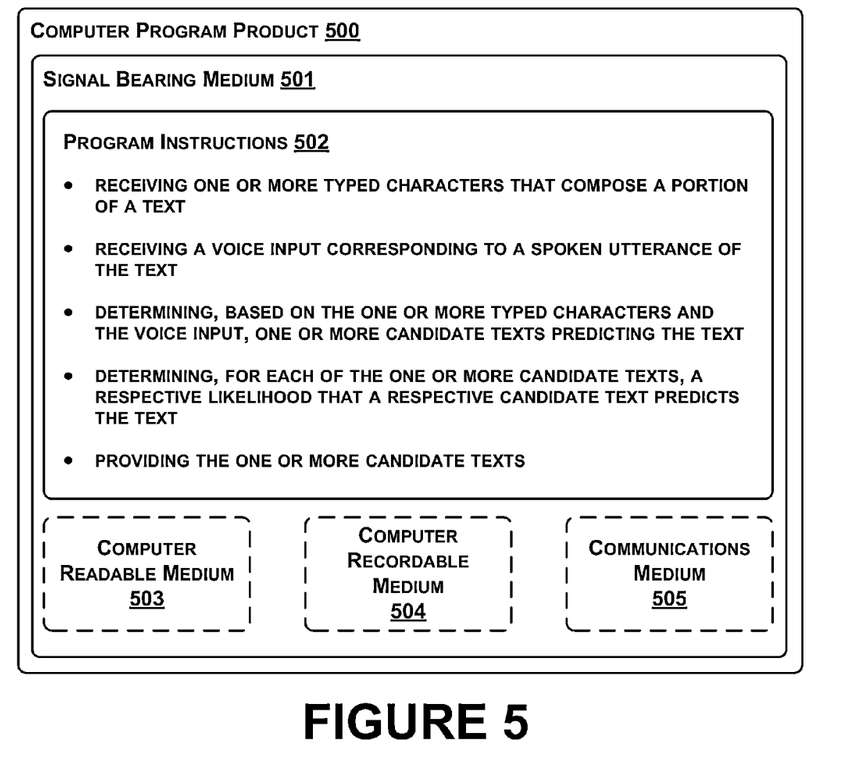
FIG. 5 is a schematic illustrating a conceptual partial view of an example computer program product that includes a computer program for executing a computer process on a computing device, arranged according to at least some embodiments presented herein.

In some examples, the disclosed methods (e.g., the method 100) may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-4. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the programmable devices 308*a*-*c* in FIG. 3, or the computing devices 418*a*-*c* of FIG. 4B may be configured to provide various operations, functions, or actions in response to the programming instructions 502 conveyed to programmable devices 308*a*-*c* or the computing devices 418*a*-*c* by one or more of the computer readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
receiving one or more typed characters that compose a portion of a text, wherein the one or more typed characters are in a first language;

receiving a voice input corresponding to a spoken utterance of at least the portion of the text, wherein the spoken utterance is in a second language different from the first language;

determining, based on the one or more typed characters and the voice input, one or more candidate texts predicting the text; and providing the one or more candidate texts.

2. The method of claim 1, wherein the text is one of: (i) a morpheme, (ii) a word, or (iii) a phrase.

3. The method of claim 1, wherein the first language is English and the one or more typed characters include Pinyin characters, and wherein the second language is one of Chinese, Japanese, or Korean.

4. The method of claim 1, wherein receiving the portion of the text and the voice input comprises receiving the portion of the text and the voice input at a computing device.

5. The method of claim 1, further comprising, determining, for each of the one or more candidate texts, a respective likelihood that a respective candidate text predicts the text, wherein providing the one or more candidate texts comprises providing the one or more candidate texts based on respective likelihoods determined for the one or more candidate texts.

6. The method of claim 5, wherein providing the one or more candidate texts comprises:

determining, based on the respective likelihood, a respective ranking for each of the one or more candidate texts; and generating, based on respective rankings of the one or more candidate texts, a display of a list of the one or more candidate texts.

7. The method of claim 6, further comprising:

receiving one more typed character of the text;

updating the respective likelihoods of the one or more candidate texts based on the one more typed character; and updating the respective rankings and the display of the list of the one or more candidate texts.

8. The method of claim 7, wherein updating the respective rankings and the display of the list of the one or more candidate texts comprises one or more of: (i) removing one of the one or more candidate texts from the list, (ii) adding one more candidate text to the list, or (iii) changing an order in which the one or more candidate texts are displayed on the list.

9. The method of claim 5, wherein determining, for each of the one or more candidate texts, the respective likelihood comprises:

determining a first likelihood associated with determining that candidate text based on the one or more typed characters;

determining a second likelihood associated with determining that candidate text based on the voice input; and combining the first likelihood and the second likelihood to determine the respective likelihood.

10. The method of claim 5, wherein determining the respective likelihood comprises processing the one or more typed characters and the voice input through a classifier trained by previously collected training data, wherein training the classifier comprises:

receiving training data for a plurality of typing instances, wherein respective training data, for each of the plurality of typing instances, includes (i) respective typed characters, and (ii) a respective voice input;

determining, for a respective text of each of the plurality of typing instances, a given candidate text;

receiving positive or negative indication that the given candidate text correctly predicts the respective text;

correlating, for each typing instance, the positive or negative indication with the respective training data; and determining parameters of the classifier based on correlations of the plurality of typing instances.

11. The method of claim 1, wherein determining the one or more candidate texts comprises:

determining, based on the one or more typed characters, a first set of candidate texts;

determining, based on the voice input, a second set of candidate texts; and selecting the one or more candidate texts based on a comparison of the first set of candidate texts to the second set of candidate texts.

12. A computer readable medium having stored thereon instructions that, when executed by a computing device, cause the computing device to perform functions comprising:

receiving one or more typed characters that compose a portion of a text, wherein the one or more typed characters are in a first language;

receiving a voice input corresponding to a spoken utterance of at least the portion of the text, wherein the spoken utterance is in a second language different from the first language;

determining, based on the one or more typed characters and the voice input, one or more candidate texts predicting the text; and providing the one or more candidate texts.

13. The computer readable medium of claim 12, wherein the functions further comprise determining, for each of the one or more candidate texts, a respective ranking indicative of a level of confidence that a respective candidate text predicts the text, wherein the function of providing the one or more candidate texts comprises generating, based on respective rankings of the one or more candidate texts, a display of the one or more candidate texts.

14. The computer readable medium of claim 12, wherein the functions further comprise:

receiving one more typed character of the text; and updating the one or more candidate texts based on the one more typed character, wherein the function of providing the one or more candidate texts comprises providing the one or more candidate texts based on the updating.

15. A system comprising:

an audio capture device; and a computing device coupled to the audio capture device and configured to:

receive one or more typed characters that compose a portion of a text, wherein the one or more typed characters are in a first language;

receive, from the audio capture device, a voice input corresponding to a spoken utterance of at least the portion of the text, wherein the spoken utterance is in a second language different from the first language;

determine, based on the one or more typed characters and the voice input, one or more candidate texts;

determine, for each of the one or more candidate texts, a respective likelihood that a respective candidate text predicts the text; and provide the one or more candidate texts, based on respective likelihoods determined for the one or more candidate texts.

16. The system of claim 15, wherein the text is a phrase composed of multiple words and the one or more typed characters are Pinyin initials of the multiple words, and wherein the spoken utterance is in one of Chinese language, Japanese language, or Korean language.

17. The system of claim 15, wherein, to determine the one or more candidate texts, the computing device is configured to:
- determine, based on the one or more typed characters, a first set of candidate texts;
- determine, based on the voice input, a second set of candidate texts; and
- select the one or more candidate texts that are common between the first set and the second set.

18. The system of claim 15, further comprising a display device coupled to the computing device, wherein, to provide the one or more candidate texts, the computing device is configured to:
- determine, based on the respective likelihood, a respective ranking for each of the one or more candidate texts; and
- generate, based on respective rankings, a display of the one or more candidate texts, wherein the displayed one or more candidate texts are user-selectable.

\* \* \* \* \*